United States Patent
Sim-Tang et al.

(10) Patent No.: US 7,681,104 B1
(45) Date of Patent: Mar. 16, 2010

(54) METHOD FOR ERASURE CODING DATA ACROSS A PLURALITY OF DATA STORES IN A NETWORK

(75) Inventors: Siew Yong Sim-Tang, Saratoga, CA (US); Semen Alexandrovich Ustimenko, Novosibirsk (RU)

(73) Assignee: BakBone Software, Inc., San Diego, CA (US)

( * ) Notice: Subject to any disclaimer, the term of this patent is extended or adjusted under 35 U.S.C. 154(b) by 1196 days.

(21) Appl. No.: 11/198,061

(22) Filed: Aug. 5, 2005

Related U.S. Application Data (60) Provisional application No. 60/599,962, filed on Aug. 9, 2004.

(51) Int. Cl.
*G11C 29/00* (2006.01)
*H03M 13/00* (2006.01)

(52) U.S. Cl. .................. 714/763; 714/769; 714/770

(58) Field of Classification Search .................. 714/763, 714/769, 770
See application file for complete search history.

(56) References Cited

U.S. PATENT DOCUMENTS

| | | | |
|---|---|---|---|
| 4,336,612 A | 6/1982 | Inoue et al. | |
| 4,402,045 A | 8/1983 | Krol | |
| 4,512,020 A | 4/1985 | Krol et al. | |
| 4,593,351 A | 6/1986 | Hong et al. | |
| 4,633,472 A | 12/1986 | Krol | |
| 4,710,926 A | 12/1987 | Brown et al. | |
| 4,868,742 A | 9/1989 | Gant et al. | |
| 4,884,194 A | 11/1989 | Krol et al. | |
| 5,020,060 A * | 5/1991 | Murai et al. ................. | 714/784 |
| 5,032,985 A | 7/1991 | Curran et al. | |
| 5,155,820 A | 10/1992 | Gibson | |
| 5,276,684 A | 1/1994 | Pearson | |
| 5,305,326 A | 4/1994 | Solomon et al. | |
| 5,375,128 A | 12/1994 | Menon et al. | |
| 5,379,305 A * | 1/1995 | Weng .......................... | 714/774 |
| 5,388,013 A * | 2/1995 | Nakamura .................... | 360/48 |
| 5,560,033 A | 9/1996 | Doherty et al. | |
| 5,606,569 A * | 2/1997 | MacDonald et al. ......... | 714/758 |
| 5,651,129 A | 7/1997 | Yokote et al. | |
| 5,819,020 A | 10/1998 | Beeler, Jr. | |
| 5,942,005 A * | 8/1999 | Hassner et al. ............... | 714/784 |
| 5,974,563 A | 10/1999 | Beeler, Jr. | |

(Continued)

OTHER PUBLICATIONS

U.S. Appl. No. 11/198,062, Sim-Tang.

*Primary Examiner*—Joseph D Torres
(74) *Attorney, Agent, or Firm*—Winstead PC (57) ABSTRACT

An efficient method to apply an erasure encoding and decoding scheme across dispersed data stores that receive constant updates. A data store is a persistent memory for storing a data block. Such data stores include, without limitation, a group of disks, a group of disk arrays, or the like. An encoding process applies a sequencing method to assign a sequence number to each data and checksum block as they are modified and updated onto their data stores. The method preferably uses the sequence number to identify data set consistency. The sequencing method allows for self-healing of each individual data store, and it maintains data consistency and correctness within a data block and among a group of data blocks. The inventive technique can be applied on many forms of distributed persistent data stores to provide failure resiliency and to maintain data consistency and correctness.

6 Claims, 10 Drawing Sheets

U.S. PATENT DOCUMENTS

| | | | |
|---|---|---|---|
| 6,041,431 A * | 3/2000 | Goldstein | 714/784 |
| 6,389,573 B1 * | 5/2002 | Weng | 714/784 |
| 6,397,365 B1 | 5/2002 | Brewer et al. | |
| 6,584,438 B1 | 6/2003 | Manjunath et al. | |
| 6,606,727 B1 * | 8/2003 | Yang et al. | 714/774 |
| 6,769,088 B1 * | 7/2004 | Weng | 714/766 |
| 6,886,162 B1 | 4/2005 | McKenney | |
| 7,103,824 B2 * | 9/2006 | Halford | 714/759 |
| 7,327,287 B2 * | 2/2008 | Martinian et al. | 341/51 |

\* cited by examiner

METHOD FOR ERASURE CODING DATA ACROSS A PLURALITY OF DATA STORES IN A NETWORK

This application is based on and claims priority from provisional application Ser. No. 60/599,962, filed Aug. 9, 2004.

CROSS-REFERENCE TO RELATED APPLICATION

This application is related to commonly-owned application Ser. No. 11/198,062 filed Aug. 5, 2005, and titled "Method for lock-free clustered erasure coding and recovery of data across a plurality of data stores in a network."

BACKGROUND OF THE INVENTION

1. Field of the Invention

The present invention relates to a novel consistency management method that applies redundancy encoding and decoding of data blocks across a plurality of interconnected data stores in a network.

2. Related Art

Erasure coding is an error correction encoding and decoding scheme. Erasure coding is applied to a set of data stores to generate one or more redundant data blocks to protect against erasure of the actual data. A data store refers to a persistent memory for a given data block. In the event of data loss, part of the remaining original data blocks and part of the redundant data blocks can be used to recover the entire original data set. In the event of a device failure (e.g., a data store failure), and when a replacement device is available, the recovered data blocks can be used to reconstruct a latest consistent state of the failed device for distribution to the replacement device.

Figure 1:
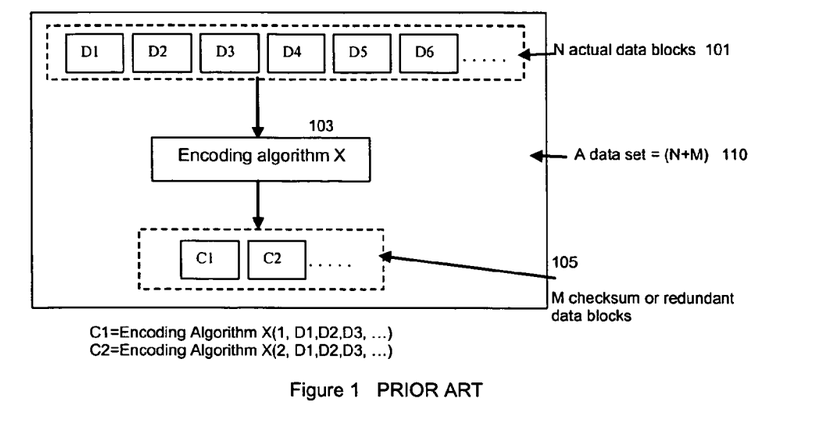
FIG. 1 is an illustration of a known erasure encoding procedure.
Figure 2:
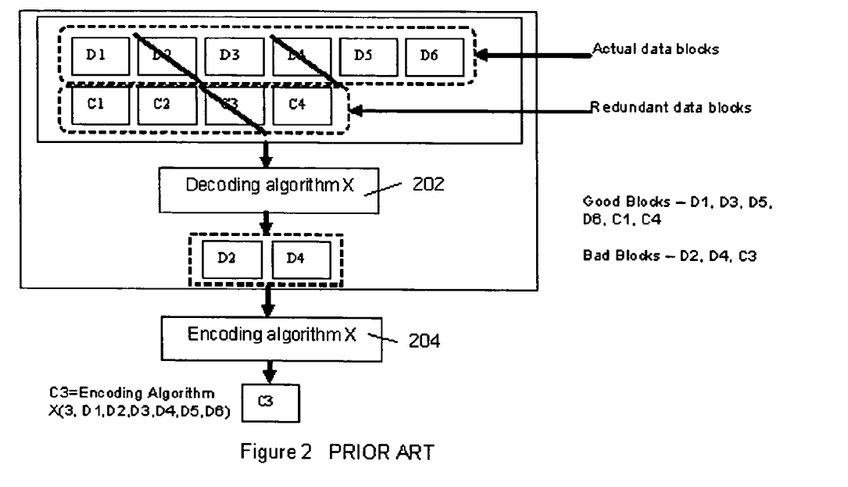
FIG. 2 is an illustration of a known recovery procedure using a combination of decoding and encoding.

There are many different types of erasure or error correction coding known in the art. These include, without limitation, data mirroring, parity coding, and algebraic-based coding. Data mirroring and parity coding generally create one additional data block from a number N of original data blocks. This type of coding scheme allows a single data set to survive through one failure while still having the capability to reconstruct the original data. Multi-dimensional parity coding may be applied across several data sets to allow for two or more concurrent failures. Such multiple dimensional parity coding supports multiple failures by combining multiple encoded data sets. Thus, for example, in the case of the two-dimensional parity coding, vertical and horizontal data sets individually allow only one failure, whereas the combination of both data sets allows for two failures. Algebraic-based coding schemes, such as a Reed Solomon code, take N data blocks and generate N+M data blocks. This well-known process is illustrated in FIG. 1, using the N data blocks 101, and an encoding algorithm 103, which generates a (N+M) data set 110 having M checksum blocks 105. The associated recovery procedure also is well-known as illustrated by example in FIG. 2. In this example, blocks D2, D4 and C3 are presumed to be bad; nevertheless, the decoding algorithm 202 can still be used to recover D2 and D4, which blocks are then used to recover the checksum block C3.

In general, when a data failure occurs, this type of algebraic-encoding scheme requires only any random N copies of data blocks from the N+M number of data blocks to reconstruct the lost data. Thus, algebraic encoding supports up to M concurrent failures in a single data set. To apply algebraic-based coding, when an encoding process detects a data change from one data store, it must generate and update all M redundant data blocks.

In other words, it is required that the process have the capability to ensure all M redundant data blocks are completely updated. Because the process may fail during the update (during which other failures may also occur simultaneously), there needs to be a self-healing technique to recover the data from the failure(s).

Figure 3:
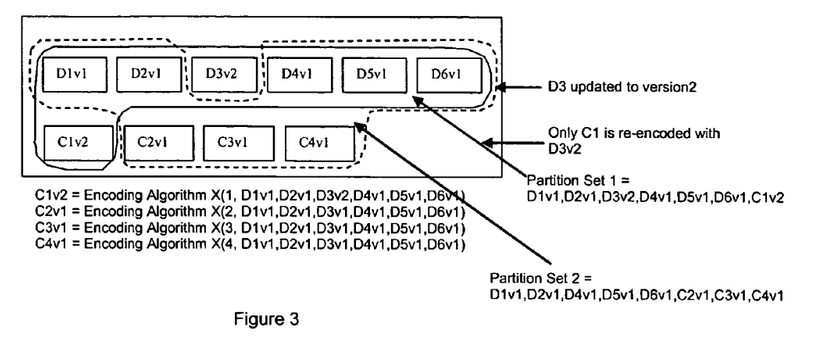
FIG. 3 is an illustration of an inconsistent data set.
Figure 4:
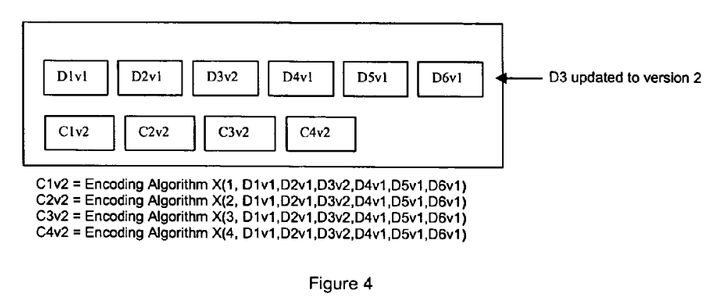
FIG. 4 is an illustration of a roll-forward operation to restore consistency.
Figure 5:
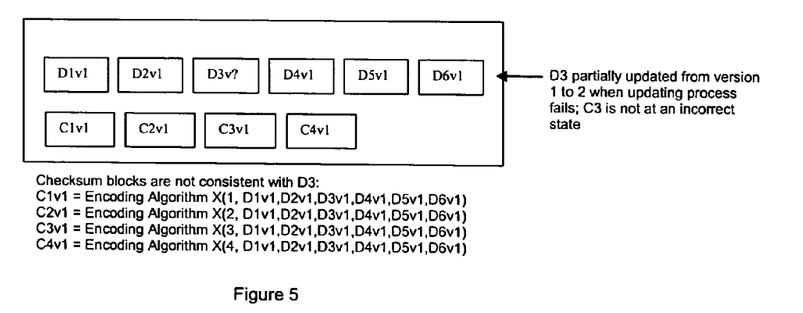
FIG. 5 is an illustration of an incorrect and inconsistent data set.

When applying multiple redundancy erasure coding (such as algebraic-based coding) to data blocks in a set of data stores, one also needs to consider the consistency of the entire data set as well as the correctness of the data blocks. A set of data blocks is considered to be consistent if all the redundant blocks are generated from all the original data blocks. For example, in FIG. 1 all the redundant data blocks 105 are generated by all the data blocks 101 using the encoding algorithm 103. In the event of an update failure during encoding, the set of data blocks may become inconsistent, as indicated in FIG. 3 and as described in more detail below. The common solutions to address an inconsistent set of data blocks are: do nothing, manage the situation on a case-by-case basis using a specific application, or simply re-execute the encoding process to regenerate all the redundant data blocks in a data store, as illustrated in FIG. 4. The problem with the first solution is that the set of data blocks becomes inconsistent and incorrect. If failure occurs to the inconsistent data set (as shown in FIG. 3), the decoding process would generate incorrect data. The second solution may result in implementation complexity. The main issue with the third solution is that it does not address data correctness. In particular, when a procedure that modifies a data block fails in the middle of the operation, the data within the block is inconsistent and incorrect, as illustrated in FIG. 5. The third solution also does not address the situation where there are data store failures. When a data store failure occurs, and if the data store is used for storing the actual data, the re-encoding process cannot proceed. If the data store is used for storing a redundant block, then the re-encoding process is not able to update all the redundant data stores, in which case there is no way to identify which data block is inconsistent when the unavailable data store becomes available again.

While multiple redundancy erasure coding could increase data reliability, it has not been possible to apply it to persistent data stores that are being constantly updated. To address this deficiency, there needs to be an efficient and simple consistency management method in an encoding process to apply the erasure coding. Such a consistency management method would allow data stores to self-heal from failures, and it would ensure data consistency and correctness among all the data blocks.

The present invention addresses this need in the art.

BRIEF SUMMARY OF THE INVENTION

The invention provides an efficient method to apply an erasure encoding and decoding scheme across multiple dispersed data stores that receive constant updates. A data store is a persistent memory for storing a data block. Such data stores include, without limitation, a group of disks, a group of disk arrays, a distributed storage area network (SAN) with virtual data blocks or virtual volumes, or any other standalone or distributed systems, machines, or devices, that hold content fragments over LAN and WAN. The data blocks may contain, by way of example, raw block data, database records, fragments of files, or any fragments of application information. As will be seen, the invention allows for self-healing of each individual data store, and it maintains data consistency and correctness within a data block and among a group of data blocks. The inventive technique can be applied on many forms of distributed persistent data stores to provide failure resiliency and to maintain data consistency and correctness.

A more specific aspect of the invention is an encoding process that applies a sequencing method to assign a sequence number to each data and checksum block as they are modified and updated onto their data stores. The method preferably uses the sequence number to identify data set consistency.

Another more specific aspect of the invention is a recovery process that uses a sequencing method to identify the state of a set of data blocks, and that operates to fix inconsistent data to bring a set of data stores to a consistent state.

Another more specific aspect of the invention is a reconstruction process that recovers lost data from data store failure, and that places the recovered data into replacement data stores.

According to the one or more described embodiments and variations thereon, the invention provides a simple and efficient method and apparatus for providing failure resiliency in distributed and persistent data stores, for maintaining the consistency and correctness of the data in the data stores, and for ensuring the recoverability of the data upon multiple concurrent failures.

A specific embodiment of the invention provides an improved mechanism to provide failure resiliency in a disk array by applying erasure coding to generate multiple redundant data blocks residing in the data stores in an array of disks. This embodiment allows for the data blocks in the disk array to survive through and recover from multiple concurrent device and processor failures. The technique described below allows for self-healing of the disk array to a consistent and correct state. It enables data to recover from multiple device and processing failures, and to enable the data stores to be reconstructed.

In an illustrative embodiment, the method is defined by a set of one or more unordered steps including: (1) identifying N number of original data blocks residing in a data store, (2) locating M number of additional data stores for storing redundant data blocks (checksum blocks), (3) assigning a sequence number to each of the data and checksum stores, (4) applying a given erasure encoding scheme to generate M checksum blocks from N data blocks, and storing the checksum blocks in their associated data store, and (5) for decoding, applying a given erasure decoding scheme to generate all data and checksum blocks from a consistent set of N number of data or checksum blocks. The consistency of a data set is determined using the sequence number assigned to each block. The data and checksum blocks together are sometimes referred to herein as a "data set."

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention. In the accompanying drawings.

DETAILED DESCRIPTION OF THE INVENTION

As described above, the present invention relates generally to a method and system for maintaining data correctness and consistency while applying erasure coding to a distributed set of data stores. In particular, the invention provides a highly-efficient sequencing technique for performing erasure encoding and decoding for multiple concurrent data stores, while maintaining data consistency and integrity even during processing and device failures. In general, the purpose of this invention is to provide failure resiliency of the data stores by allowing automated self healing and maintaining data consistency and correctness.

The invention is described with reference to specific architectures and protocols. Those skilled in the art, however, will recognize that the description is for illustration purposes only. One embodiment of the invention provides a method to apply multiple redundancy erasure coding to a disk array, and to enable that array to self-recover to a consistent state under multiple concurrent failures. Another embodiment of the invention provides a method to apply multiple redundancy erasure coding in two dimensions to a group of disk arrays. These embodiments, however, are not limiting, as the principles of the invention may be applied in any standalone or distributed processing or data storage environment.

The representative embodiments are described in more detail below.

A. Multiple Redundancy Coding

As noted above, one form of multiple redundancy coding is an algebraic-based code, such as Reed Solomon, Rabin's Information Dispersal Algorithm (IDA), or the like. This type of code interprets symbols larger than bits as elements, and uses the elements to calculate parity or checksum symbols. The specific algebraic-based code that may be useful here is beyond the scope of this invention. It is merely assumed that one such code is used for the implementation.

As illustrated in FIG. 1, and as well-known in the prior art, a multiple redundancy code applies its encoding algorithm 103 to N data elements to generate N+M data elements. The N+M data elements are a data set 110. In the data set, M elements 105 are the checksum elements. A multiple redundancy code requires any N elements from the data set of N+M elements to facilitate decoding as shown, by way of example, in FIG. 2. In this example, as noted above, it is assumed that data blocks D2 and D4, as well as checksum block C3, have been lost. Nevertheless, the decoding algorithm 202 is used to re-generate the data blocks D2 and D4, which are then used by encoding algorithm 204 to re-generate the checksum block C3. Thus, more generally, if some data elements are not available, this known scheme applies decoding and then re-encoding as needed to generate the complete data set.

Figure 6:
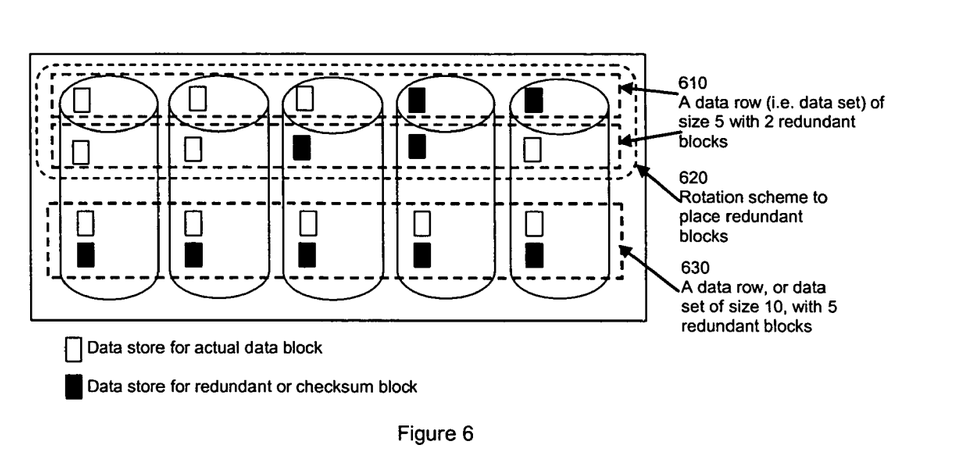
FIG. 6 provides an illustrative embodiment of a data set configuration on a disk array.
Figure 7:
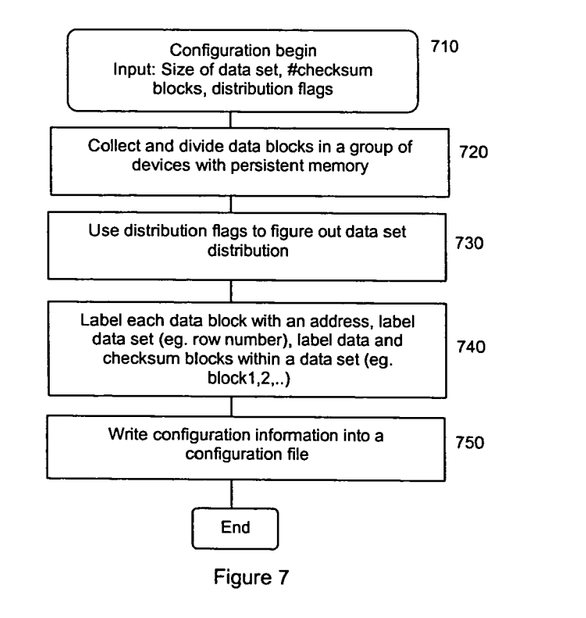
FIG. 7 is a process flow diagram showing a data set configuration process in a disk array in accordance with an embodiment of the present invention.

This type of algebraic-based code is very powerful if used on persistent data stores (such as disks or distributed devices) with persistent memory for constant read and write operations. To apply this type of code on persistent data stores that update constantly, however, one must have a technique that can manage random processor or device failures during the encoding and decoding process. Such a technique must have the capability of recovering from a failure during encoding, it must maintain data correctness and data store consistency, and it must provide automated self-healing of the data stores. It must also work appropriately with the encoding and decoding scheme to ensure failure resiliency to the persistent data stores. The present invention solves these and other problems associated with the known art, as will now be described B. Multiple Redundancy Coding on a Disk Array B.1 Disk Array Configuration FIG. 6 illustrates a disk array 600 of five disks. According to the invention, a configuration process is used to configure the disk array. This process is typically implemented as software, namely, a set of instructions that are executable in one or more processors. The configuration process is illustrated in FIG. 7. In particular, and as will be described in more detail below, the configuration process beginning at step 710, takes given input parameters and divides the disks into groups of data set stores (for storing erasure encoded data); the configuration process also labels all the data stores with a type and an address. The data store type indicates if the store is to be used for storing an actual data block or checksum block. A data store may span multiple disk sectors. The input parameters preferably include a size of data set, a number of checksum blocks in each set, and a distribution flag to indicate a method for deciding the distribution of the data sets and the location of the checksum blocks within a data set.

An administrator or other user may configure the size of a data set to be the same as the number of disks in an array. Preferably, and depending on the coding scheme involved, the number of checksum blocks is smaller then the size of the data set. The higher the number of checksum blocks, the more concurrent failures the disk array can sustain; therefore, the higher the reliability of the array. A simple method of data set and checksum block distribution is illustrated in FIG. 6 by reference numeral 610. This method simply lines up one data store block per disk to form a data row. In the illustrated example, the number of checksum block is two, so one may use the last two disks for storing checksum blocks. In another example, as shown by reference numeral 620 in FIG. 6, a rotating scheme is used to put checksum blocks at different locations for different data sets. It may also be desirable to create data set size larger then the number of the disks. For example, in the rotating scheme 620, the size of the data set is two times the number of disks, with the first data row for storing actual data, and the second row for storing checksum data. In still another embodiment, as illustrated by reference numeral 630, a data set of size 10 includes five (5) data stores and five (5) redundant blocks.

As noted above, FIG. 7 is a flowchart illustrating a representative data set configuration process. The process begins at step 710 with the input parameters previously described. At step 720, the process collects and divides the data blocks across a group of devices each having persistent memory. At step 730, the process utilizes the distribution flags to determine a data set distribution. At step 740, the process labels each data block, and labels the data and checksum blocks within a data set. The routine then writes the configuration information into a configuration file at step 750 to complete the processing.

Once the configuration is done, any convenient erasure coding scheme (e.g., a Reed Solomon scheme) can be applied as data is inserted into the stores. In particular, when data is input to a data store, an encoding process is triggered. During encoding, an erasure encoding process of the present invention uses the configuration information generated by process illustrated in FIG. 7 to locate the data sets. The configuration information includes the layout of the data sets in one or multiple data stores or devices. In particular, the layout describes an erasure group by rows or columns, the distribution of the blocks in the group, as well as the description of which block is actual data and which block is a checksum (i.e. a recovery block). The configuration information may specify the block address range for each group such that, when a block is to be modified, its address is used to locate the group. The configuration information also may be a given function that can identify a data set when a block address is input to the function. For example, assume the storage is a five disk array of a specific size (e.g., 10 GB) with the distribution of the erasure coding being as illustrated by reference numeral 610. When block X of disk 1 is to be modified, the erasure group of X in disk 1 would then be {X in disk 1, X in disk 2, X in disk3, X in disk 4, and X in disk 5}.

B.2 Data Set Consistency

By way of background, a data set is said to be "consistent" if all the checksum blocks are encoded using all the actual data blocks. Suppose for example:

W is a set containing all the actual data blocks, where there are N elements;

V is a set containing all the checksum blocks, where there are M elements

The data set then is U=W+V

A "consistent" data set is then defined as follows:

$v_i$=erasure encode (i, $w_1$, $w_2$, ... $w_N$) where I=1 ... M; where $v_i$ belongs to V, and $w_1$ to $w_N$ belongs to W.

B.3 Data Set Partition

A data set is "partitioned" if some subsets of the checksum blocks are encoded with some subsets of the actual data blocks. A combination of the consistent checksum and actual data block subsets then forms a data set "partition" as follows:

W=a set of actual data blocks, V=a set of checksum data blocks $E_i$=a subset of W, where i=integer 1 ... u $F_j$=a subset of V, where j=integer 1 ... u $E_1$+ ... +$E_u$=W $F_1$+ ... +$F_u$=V $E_1$, ... $E_u$ may overlap, and each one of them may be empty $F_1$, ... $F_u$ may overlap, and each one of them may be empty All elements of $E_i$ are encoded with all elements of $F_i$.

A data set partition $i=E_i+F_i$, where $u=1\ldots u$

FIG. 3 shows two such partitions:

Data set partition 1=D1v1, D2v1, D4v1, D5v1, D6v1, R2v1, R3v1, R4v1

Data set partition 2=D1v1, D2v1, D3v2, D4v1, D5v1, D6v1, R1v2

When a data set is partitioned, each one of the partitions is consistent, but the data set as a whole is said to be inconsistent. An inconsistent data set is illustrated in FIG. 3.

B.4 Data Correctness

A "correct" data block is a data block that is completely updated during a write operation. Thus, for example, assume a data block is at state 1 initially when an update (to modify the data block to state 2) occurs. If the update only modifies a portion of the block (e.g., the data block contains some state 1 information and some state 2 information), the data block is said to be incorrect.

B.5 Erasure Encoding Using Sequencing

Assume C is a counter for a data set, N is the number of actual data blocks in a data set, and M is the number of the checksum blocks in a data set. Further, assume there is one registry for each data store for the actual data or checksum blocks and in which a sequence number is recorded.

Figure 8:
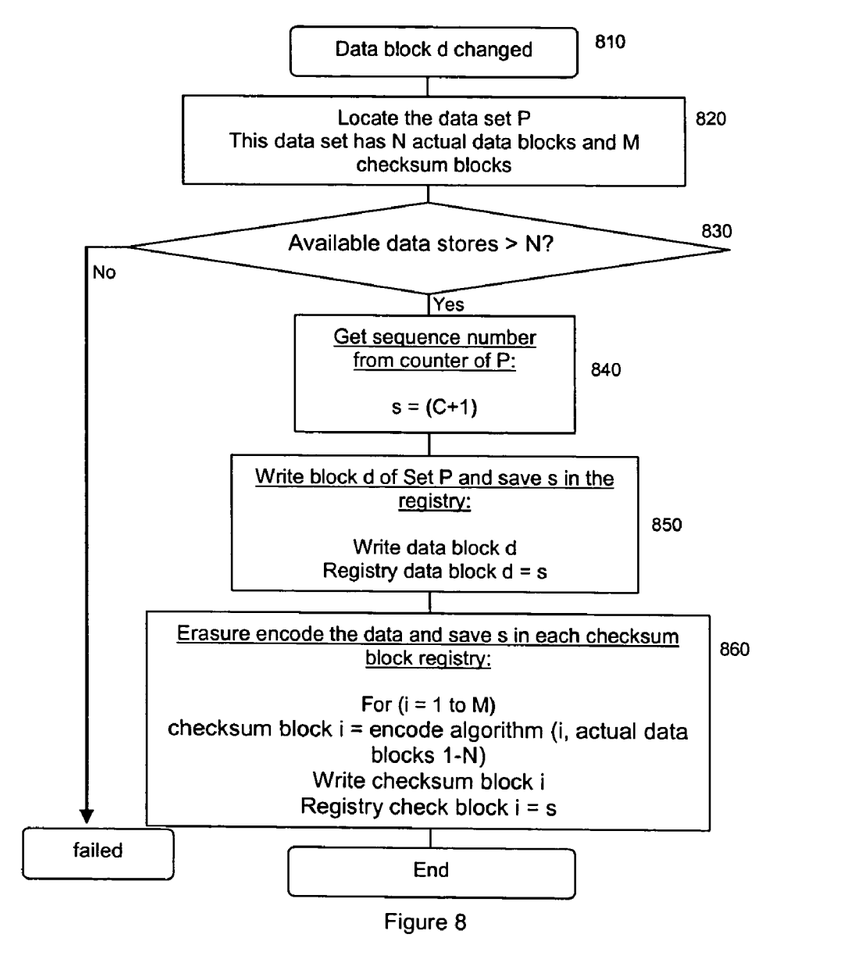
FIG. 8 is a process flow diagram showing an erasure encoding process that may be used to encode a data set using a sequencing method in accordance with the present invention.

When an actual data block d is changed and an update to its data store is needed, the erasure encoding process in FIG. 8 is executed. This process may be implemented in code executable on one or more processors. First, the encoding process locates the data set and the actual location (data stores) of each of the data and checksum blocks. This is step 820. A test is then performed at step 830 to determine if the number of data stores available is greater than N. If not, the routine fails and terminates. If, however, the outcome of the test at step 830 is positive, the encoding process then increments the counter of the data set to generate a new sequence numbers. This is step 840. The new sequence number s is then used to enter the registry of the updating data block d and all the checksum blocks once they are modified (steps 850 and 860). In particular, at step 850, the process writes the data block d and saves the new sequence number s in the data block's associated registry. At step 860, the process then erasure encodes the data and saves the new sequence number in each checksum block registry, as checksum blocks are always modified by changes to any underlying data block. The encoding process of FIG. 8 is now illustrated using several examples.

EXAMPLES

Assume a given data set has five (5) data blocks and two (2) check blocks. In the illustrative embodiment, this requires a total of seven (7) registries. As used herein, a "registry" is any accessible portion of memory or data storage. One or more registries generally comprise a data structure (or data array, linked list, or the like), with a given position in the data structure corresponding to a given registry. At time $t_0$, assume the counter C of the data set is initialized to a given value (e.g., zero (0)) and the registries are initialized to the given value as follows.

Time $t_0$:

Counter C=0

| D1 | D2 | D3 | D4 | D5 | C1 | C2 |
|----|----|----|----|----|----|----|
| 0  | 0  | 0  | 0  | 0  | 0  | 0  |

At time $t_1$, data block number two (2) changes. After executing the encoding process 800 as described above, the registries are now as follows:

Time $t_1$: D2 changed

Counter C=1

| D1 | D2 | D3 | D4 | D5 | C1 | C2 |
|----|----|----|----|----|----|----|
| 0  | 1  | 0  | 0  | 0  | 1  | 1  |

After that, assume there are the following sequences of changes:

Time $t_2$: D3 changed

Counter C=2

| D1 | D2 | D3 | D4 | D5 | C1 | C2 |
|----|----|----|----|----|----|----|
| 0  | 1  | 2  | 0  | 0  | 2  | 2  |

Time $t_3$: D5 changed

Counter C=3

| D1 | D2 | D3 | D4 | D5 | C1 | C2 |
|----|----|----|----|----|----|----|
| 0  | 1  | 2  | 0  | 3  | 3  | 3  |

Time $t_4$: D3 changed

Counter C=4

| D1 | D2 | D3 | D4 | D5 | C1 | C2 |
|----|----|----|----|----|----|----|
| 0  | 1  | 4  | 0  | 3  | 4  | 4  |

Failure Case 1:

At time $t_5$, assume that data block D4 changed, C1 is updated, but that C2 fails to be updated due to some device failure. The registry values are then as follows:

Time $t_5$: D4 changed

Counter C=5

| D1 | D2 | D3 | D4 | D5 | C1 | C2 |
|----|----|----|----|----|----|----|
| 0  | 1  | 4  | 5  | 3  | 5  | 4  |

In such case, there are now two data set partitions:

Data set partition 1=(D1, D2, D3, D4, D5, C1) state of $t_5$

Data set partition 2=(D1, D2, D3, D5, C2) state of $t_4$

In this data set configuration, five (5) blocks (any of the actual data and checksum blocks) are required to reconstruct the entire seven (7) element data set. To bring the entire seven element set to a consistent state, either partition 1 or partition 2 can be used.

Assume that C2 becomes accessible later and no data is corrupted. The method either can roll forward the entire data set to state of $t_5$ by using partition one (1), or it can roll backward the data set to the state $t_4$ by using partition two (2).

Failure Case 2:

At time $t_5$, assume D4 changed, C1 is updated, but that C2 fails to be updated due to the C2 device failure and the device is to be replaced. The registry values are then as follows:

Time t5: D4 changed

Counter C=5

| D1 | D2 | D3 | D4 | D5 | C1 | C2 |
|----|----|----|----|----|----|----|
| 0  | 1  | 4  | 5  | 3  | 5  | *  |

In this case, there are now two consistent data set partitions:
Data set partition 1=(D1, D2, D3, D4, D5, C1) state of t5
Data set partition 2=(D1, D2, D3, D5) state of t4

Because in this example a minimum of five (5) elements is required to recover the entire data set (due to the encoding scheme used), partition 2 is unacceptable. Thus, the only recovery choice is to roll forward to $t_5$ using partition one (1). The checksum block C2 in this case cannot be recovered, e.g., until a replacement device is ready. During this time, the data set can continue to be modified and updated as long as there is a consistency management method to identify the consistency and recover the data at any time in the future.

Failure Case 3:

At time $t_5$, assume D4 changed, and both C1 and C2 devices fail and replaced. The registry values are now as follows:

Time t5: D4 changed

Counter C=5

| D1 | D2 | D3 | D4 | D5 | C1 | C2 |
|----|----|----|----|----|----|----|
| 0  | 1  | 4  | 5  | 3  | *  | *  |

In this case, there is only one consistent data set partition:
Set 1=(D1, D2, D3, D4, D5) state of t5

When replacement data stores are inserted, C1 and C2 can be reconstructed to state of $t_5$.

Although in the above examples the encoding method uses an increment of one (1) for the sequence number, this is not a requirement or a limitation of the technique. For example, the counter can be increment by a given amount, e.g., −1, 2, or any number. Moreover, the sequence number itself can be a given function of the counter.

Generalizing, as can be seen, the above-identified sequencing scheme involves several basic steps: (a) initializing a counter; (b) storing sequence numbers in a data structure (such as the registry table illustrated above) having N+M positions corresponding to the data blocks and their associated recovery blocks; (c) as a given data block is changed, (i) incrementing the counter by a given value (e.g., 1) (ii) assigning the value of the counter to the sequence number at a position associated with the given data block, and (iii) assigning the value of the counter to the sequence number at each position in the data structure associated with a recovery block; and (d) repeating step (c) as one or more data blocks are changed. The resulting data structure is then useful to facilitate a recovery process upon the occurrence of a failure event.

B.6 Correctness Determination

Figure 11:
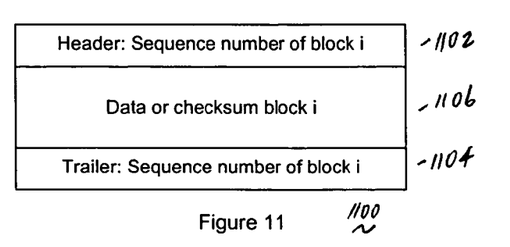
FIG. 11 shows a block wrapper for storing sequence numbers and update completion flags in accordance with an embodiment of the present invention.

The above described encoding method does not have an indicator to determine if a data block is modified completely. To determine if a data block is correct, an indicator, such as a flag or another sequence number register for each data block, can be used. One embodiment is to have the sequence number entered in the header and trailer of the data and checksum block. FIG. 11, described below, shows a typical block structure. When either a data block or a checksum block changes, preferably the sequence number in both the block header and trailer is checked. If a block is partially written, then the header would not match the trailer. When a data block is partially modified after a failure, the data block is considered as an incorrect block and needs to be recovered. An illustrative recovery process is now described.

B.7 Recovery Process using Sequence number

When a device fails or when a software or hardware error occurs, some data blocks may be corrupted. When a failure occurs during the encoding process, the target data set may become corrupted and partitioned (i.e., inconsistent). Thus, according to the present invention, a recovery process is used to recover the data set to a consistent state. The recovery process typically is configured either to roll the data set forward to a most recent state, or to roll the data set backward to the state prior to the failure.

Figure 9A:
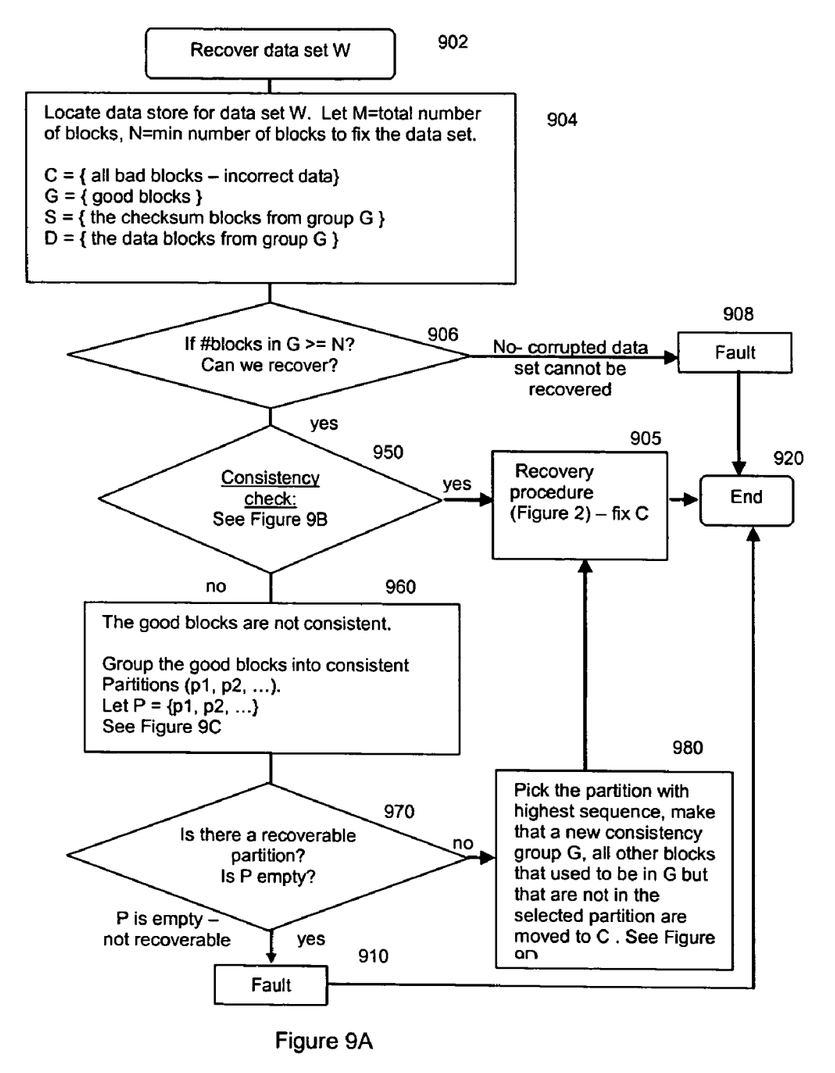
FIG. 9A is a process flow diagram showing an overall recovery process that may be used to recover a data set using sequence numbers in accordance with the present invention.

FIG. 9A illustrates a representative recovery process that may be used to recover a corrupted data set to a consistent state. This process may be implemented in code executable on one or more processors. The routine begins at step 904 by first locating the data store for data set W. At this step, the recovery process groups the data blocks into bad blocks (C), uncorrupted good blocks (G), good checksum blocks (S), and good data blocks (D). Groups S and D are subset of G. Bad blocks are blocks that have inconsistent (e.g., different) header and trailer sequence numbers, or blocks from bad devices. Then, at step 906, the recovery process checks if there are enough good blocks to recover the entire data set. In this example, it is assumed that the data set has M number of blocks and the encoding algorithm requires N number of blocks to reconstruct the data set, where M>N. If not, the routine branches to step 908 to provide a fault indication. The routine then terminates at step 920.

Figure 9B:
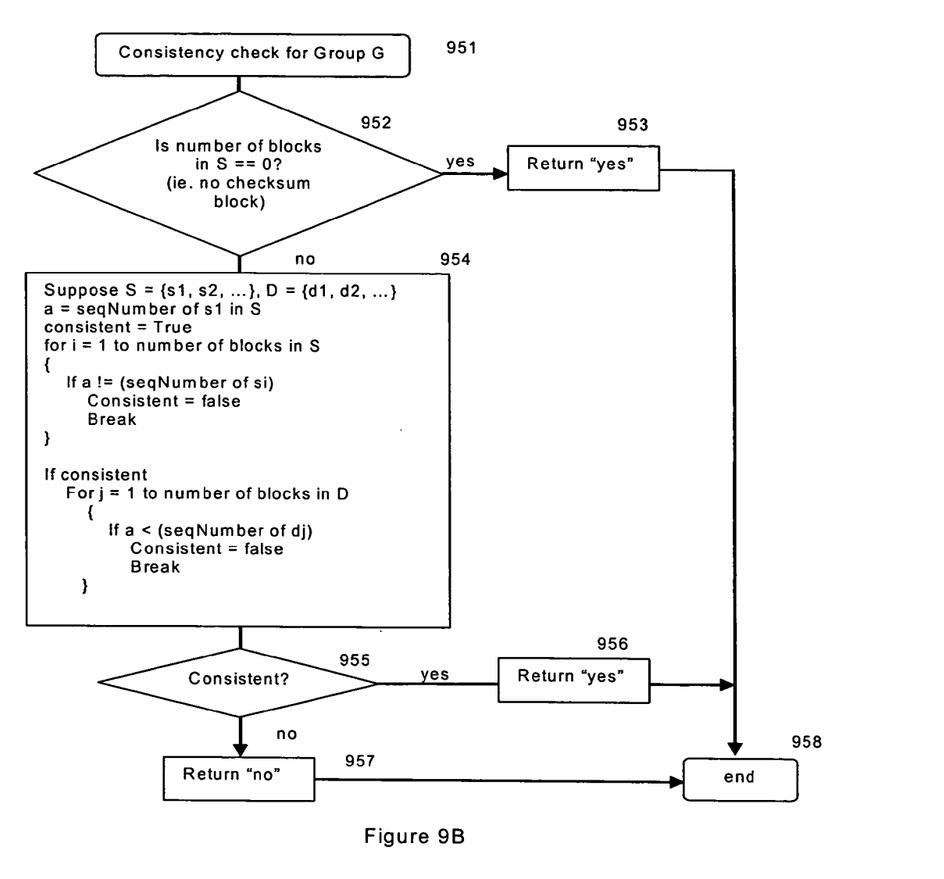
FIG. 9B is a process flow diagram of a consistency check step of the recovery process illustrated in FIG. 9A.

If there are enough good blocks to recover the data set, the routine continues at step 950 to perform a consistency check. This step is illustrated in FIG. 9B, and it is used to determine if the good blocks G are partitioned. As described above, a partition may occur when a failure takes place while the data set is going through encoding. A consistent group of blocks U is one where the sequence number of all the checksum blocks in the group is identical, and the sequence number of all the data blocks in U is less than or equal to the sequence number of the checksum blocks. If there is no checksum block in the group, then the group is said to be consistent (step 953); otherwise, the sequence number of all the blocks needs to be checked. This sequence number processing is illustrated in step 954 of FIG. 9B, which step is reached if the outcome of the test at step 952 is negative. Step 952 tests to determine whether the number S of good checksum blocks is equal to zero. After the processing in step 954, a test is performed at step 955 to determine whether, as a result of the processing, Group G is consistent. If so, a "yes" is returned at step 956; if not, a "no" is returned at step 957. The routine in FIG. 9B then returns at step 958.

Referring now back to FIG. 9A, if (as a result of the processing in FIG. 9B) the good blocks are consistent (i.e., if the good blocks are not partitioned), then a recovery procedure can be applied (on the good blocks) to re-construct the bad blocks. This is illustrated as step 907; one such recovery procedure is that illustrated in FIG. 2.

Figure 9C:
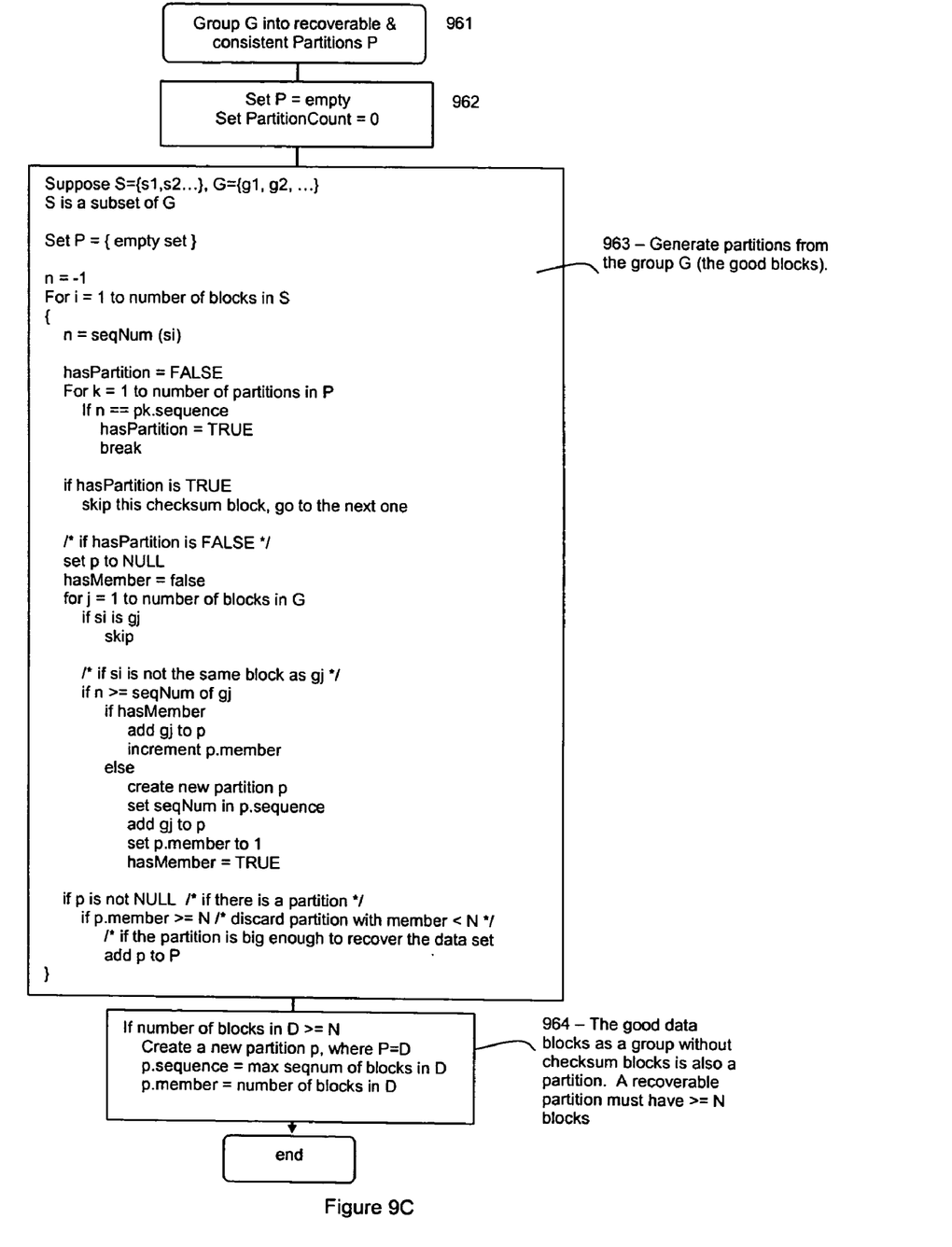
FIG. 9C is a process flow diagram of a partition generating step of the recovery process illustrated in FIG. 9A.

If (as a result of the processing in FIG. 9B) the good blocks are not consistent, then the recovery process continues in step 960. This step is required to locate all the consistent partitions. As noted above, a consistent partition is a consistent sub-group of the good blocks (G), as was illustrated (for example) in FIG. 3. The details of step 960 are shown in the process flow diagram of FIG. 9C. The routine begins at step 961 by grouping G into recoverable and consistent partitions P. At step 962, the routine sets P to an "empty" value and sets a PartitionCount equal to zero. Thereafter, the process in step 963 iterates the good checksum blocks and good data blocks according to the algorithm illustrated to create recoverable partitions, and it puts all the recoverable partitions into the set P. Each partition is a consistent sub-group, where the number of the checksum blocks are equal, and the sequence number of the data blocks is less than or equal to the checksum blocks. A recoverable partition preferably has at least N members; it is a consistent sub-group of the good blocks with at least N number of blocks and that is sufficient to recover the data set. At step 964, the routine then checks if the data blocks without the checksum block (D) are enough to form a recoverable partition. If so, this step creates a new partition that includes these blocks. This completes the processing Processing then returns to the main loop in FIG. 9A. In particular, a test is then performed at step 970 to determine whether there is a recoverable partition (i.e., is P empty?). If there is no recoverable partition located, then the data set is unrecoverable, as indicated by a positive outcome of the test at step 970; otherwise, at step 980, the routine picks a partition and continues to attempt to recover the data set with the processing shown in FIG. 9D. In particular, step 980 picks the partition with a highest sequence number and makes that a new consistency group G; all other blocks that used to be in G but that are not in the selected partition are moved to C.

Figure 9D:
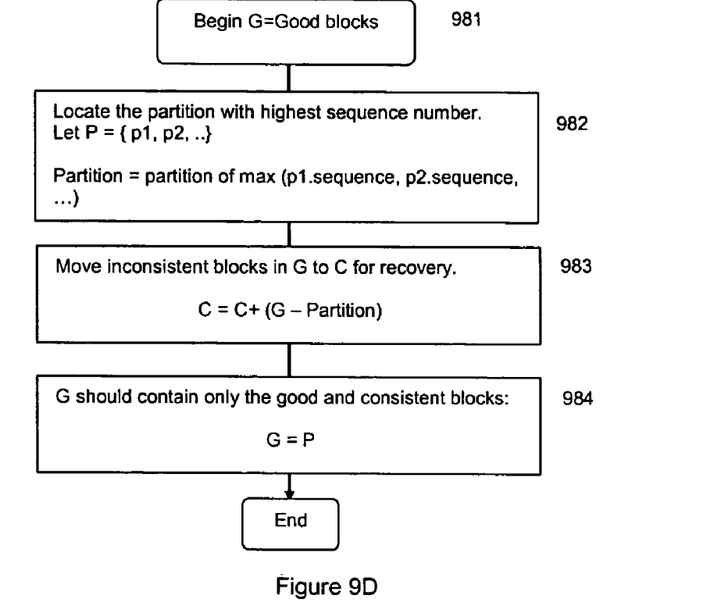
FIG. 9D is a process flow diagram of a partition locating step of the recovery process illustrated in FIG. 9A.

The routine shown in FIG. 9D illustrates one process to recover the data set, namely, by rolling the data forward to the most recent state. This technique is not meant to be taken as limiting, as has been previously noted. In this example, the routine begins at step 982 by locating the partition with the highest sequence number. All the blocks in G that are not in the selected partition are treated as bad blocks and are moved to group C for recovery. This is step 983. The only "good" blocks are now the blocks in the selected partition, as indicated by step 984. The data set is then forwarded to the applicable recovery process, such as the process shown in FIG. 2. As noted above, the recovery procedure in FIG. 2 uses decoding (and, if necessary, re-encoding) to reconstruct the entire data set.

To recover to an older state (roll backward), a partition of a lower sequence number can be selected in step 982, with the rest of the recovery process being as otherwise described.

B.8 Reconstruction Process Using Sequence Number

Figure 10:
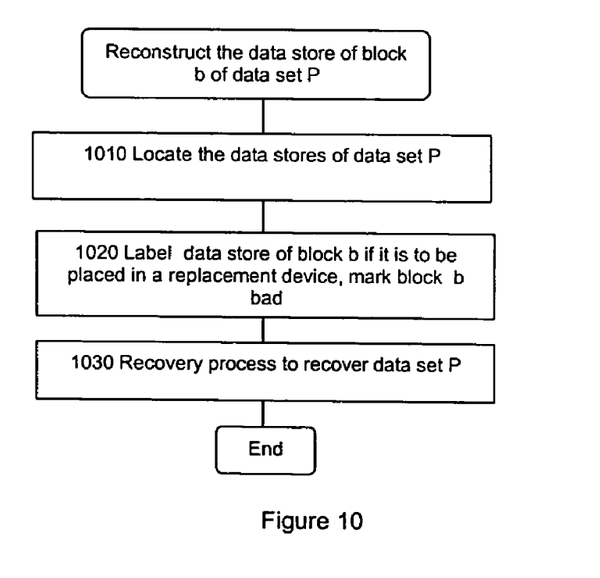
FIG. 10 is a process flow diagram showing a reconstruction process using sequence numbers in accordance with an embodiment of the present invention.

When a data store is bad, the data block it holds is lost. When a new data store is inserted as a replacement, the data block in the bad data store needs to be reconstructed into the replacement data store. FIG. 10 illustrates a reconstruction process of the present invention that uses a recovery process to reconstruct data block b for a data store. This process may be implemented in code executable on one or more processors. The process preferably first locates the data set to which block b belongs. This is step 1010. At step 1020, the process then labels the data store of block b if it is to be placed in a new device. At this time, the process then marks the data store for block b as a bad block. At step 1030, the reconstruction process calls the recovery process to fix the data store of block b.

B.9 The Sequence Number Registry and Update Completion Flag

A method to apply the sequencing technique for erasure coding to disks is to create disk blocks (as data stores) to include a header and a trailer. The header and trailer are then used to wrap around the actual data or checksum block. This data structure 1100 is indicated in FIG. 11. Both the header 1102 and the trailer 1104 are used to store the sequence number of the $i^{th}$ data or checksum block 1106. By doing so, an incorrect block can be determined. In particular, if a block were partially modified, the header and trailer would not match. Using a block wrapper, an external counter (as indicated in step 830) is not required; rather, the next sequence number for encoding is simply an increment of the highest header number of the checksum blocks. In an alternate embodiment, of course, an external counting technique to increment the sequence number may be used in connection with the present invention.

C. Multiple Redundancy Coding on Disk Arrays

Figure 12:
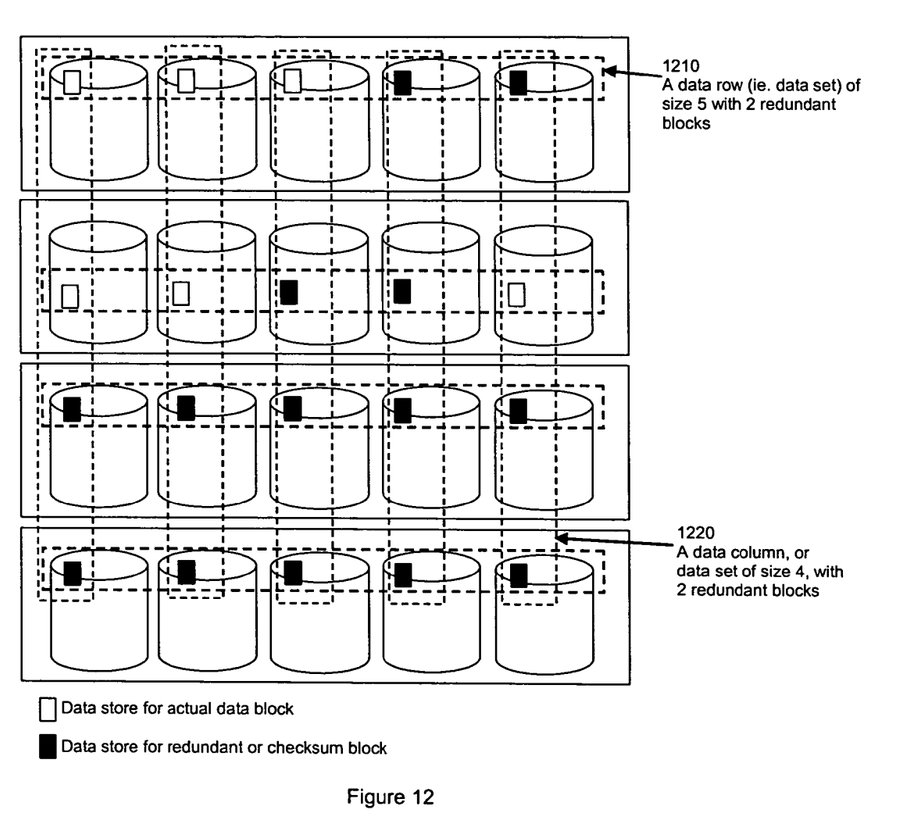
FIG. 12 is an illustrative embodiment of a data set configuration across multiple disk arrays in accordance with an alternate embodiment of the present invention.

FIG. 12 shows that the above-described sequencing technique can be applied across disk arrays such that a given data set (in this case, a data row 1210 or a data column 1220) spans multiple disk arrays. This sequencing technique can also be used to apply two-dimensional multiple redundancy coding, e.g., using a combination of data rows and data columns. In a representative example, each row and each column is individually encoded. If the number of redundant or checksum blocks in a data row is K, and the number of redundant or checksum blocks in a data column is L, the total number of random and concurrent failures the disk arrays can support is (K+L). Thus, in FIG. 12, which is merely representative, the disk arrays are capable of surviving through four (4) random and concurrent failures.

The present invention provides numerous advantages. In particular, when erasure coding is applied to distributed and persistent data stores that support multiple concurrent failures, consistency management according to the present invention ensures recoverability. This is especially important when the data stores are scattered among many different devices over local or wide area networks. The invention automatically maintains and ensures data set consistency and correctness. The method enables self-recovery of a set of data blocks to a consistent and correct state after encountering one or more failures. A by-product of the invention is a set of failure-resilient, self-managed data stores.

Figure 13:
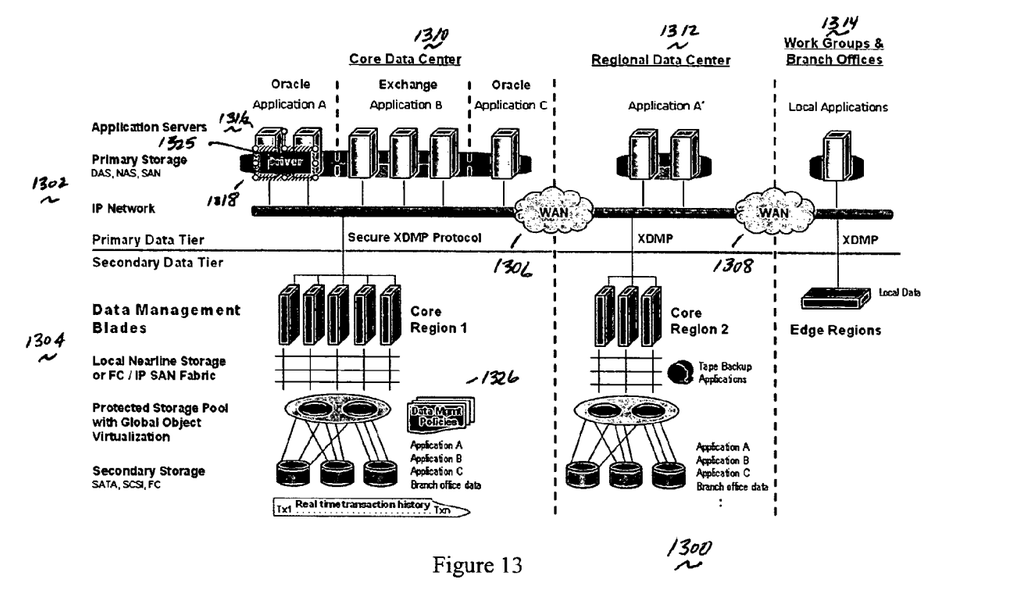
FIG. 13 is a block diagram of a representative enterprise in which the present invention may be implemented.

Although not meant to be limiting, the present invention may be implemented in an enterprise such as illustrated in FIG. 1300. The enterprise comprises a primary data tier 1302 and a secondary data tier 1304 distributed over IP-based wide area networks 1306 and 1308. Wide area network 1306 interconnects two primary data centers 1310 and 1312, and wide area network 1308 interconnects a regional or satellite office 1314 to the rest of the enterprise. The primary data tier 1302 comprises application servers 1316 running various applications such as databases, email servers, file servers, and the like, together with associated primary storage 1318 (e.g., direct attached storage (DAS), network attached storage (NAS), storage area network (SAN)). The secondary storage may be serial ATA interconnection through SCSI, Fibre Channel (FC or the like), or iSCSI. The data management server nodes create a logical layer that offers object virtualization and protected data storage. The secondary data tier is interconnected to the primary data tier, preferably through one or more host drivers 1326 to provide real-time data services.

Preferably, and as described below, the real-time data services are provided through a given I/O protocol for data transfer. Data management policies 1326 are implemented across the secondary storage in a well-known manner. A similar architecture is provided in data center 1312. In this example, the regional office 1314 does not have its own secondary storage, but relies instead on the facilities in the primary data centers.

While the present invention has been described in the context of a method or process, the present invention also relates to apparatus for performing the operations herein. As described above, this apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including optical disks, CD-ROMs, and magnetic-optical disks, read-only memories (ROMs), random access memories (RAMs), magnetic or optical cards, or any type of media suitable for storing electronic instructions, and each coupled to a computer system bus.

While the above written description also describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Having described our invention, what we now claim is as follows.

The invention claimed is:

1. A method operative within a set of data stores in which data blocks and their associated recovery blocks are stored using an erasure encoding and decoding scheme comprising:

(a) providing a processor;
(b) providing a memory interoperably coupled to the processor and having computer software code stored thereon;
(c) using the processor and the memory in combination to perform at least one of steps (d)-(g);
(d) initializing a counter;
(e) storing a sequence number in a data structure having positions corresponding to the data blocks and their associated recovery blocks;
(f) as a given data block is changed, (i) incrementing the counter, (ii) assigning a value of the counter to a then current sequence number at a position associated with the given data block, and (iii) assigning the value of the counter to a then current sequence number at each position in the data structure associated with a recovery value;
(g) upon a given failure event, using the sequence numbers in the data structure to recover a data set associated with the sequence numbers in the data structure.

2. The method as described in claim 1 wherein step (g) comprises:

identifying a set of uncorrupted blocks;
determining whether the set of uncorrupted blocks are consistent;
if the set of uncorrupted blocks are consistent, recovering the data set using information in the set of uncorrupted blocks;
if the set of uncorrupted blocks are not consistent, locating one or more recoverable subgroups of the set of uncorrupted blocks; and
recovering the data set using information in a recoverable subgroup of the uncorrupted blocks.

3. The method as described in claim 2 wherein the set of uncorrupted blocks comprises a given subset of data blocks and a given subset of recovery blocks.

4. The method as described in claim 2 wherein the determining step evaluates whether the uncorrupted blocks are partitioned.

5. The method as described in claim 2 wherein a given block is identified as uncorrupted by evaluating a block header or a block trailer.

6. The method as described in claim 2 wherein the step of locating one or more recoverable subgroups of the set of uncorrupted blocks uses a block associated with a highest sequence number in the data structure.

* * * * *